(12) United States Patent
Maton et al.

(10) Patent No.: US 7,754,800 B2
(45) Date of Patent: Jul. 13, 2010

(54) ORGANOSILOXANE COMPOSITIONS

(75) Inventors: Isabelle Maton, Morlanwelz (BE); Guiseppina Lavinaro, La Louviere (BE); Jean Willieme, Quaregnon (BE); Tommy Detemmerman, Wezembeek-Oppem (BE); Robert Drake, Penarth (GB); Jary Jensen, Midland, MI (US)

(73) Assignees: Dow Corning Europe SA, Seneffe (BE); Dow Corning Limited, Barry (GB); Dow Corning Corporation, Midland, MI (US)

( * ) Notice: Subject to any disclaimer, the term of this patent is extended or adjusted under 35 U.S.C. 154(b) by 0 days.

(21) Appl. No.: 11/910,775

(22) PCT Filed: Apr. 3, 2006

(86) PCT No.: PCT/US2006/011986

§ 371 (c)(1),
(2), (4) Date: May 20, 2008

(87) PCT Pub. No.: WO2006/107762

PCT Pub. Date: Oct. 12, 2006

(65) Prior Publication Data

US 2008/0284106 A1 Nov. 20, 2008

(30) Foreign Application Priority Data

Apr. 6, 2005 (GB) ................... 0506939.8
Aug. 6, 2005 (GB) ................... 0516239.1

(51) Int. Cl.
*C08L 83/00* (2006.01)
*C08K 3/34* (2006.01)

(52) U.S. Cl. .............. 524/425; 524/588; 524/423; 524/431; 524/451; 524/456; 524/448

(58) Field of Classification Search .................. 524/425
See application file for complete search history.

(56) References Cited

U.S. PATENT DOCUMENTS

| | | | |
|---|---|---|---|
| 3,220,879 A | 11/1965 | Stare et al. | |
| 3,341,486 A | 9/1967 | Murphy | |
| 3,378,520 A * | 4/1968 | Noll et al. | ............... 528/33 |
| 3,419,593 A | 12/1968 | Willing | |
| 3,427,270 A | 2/1969 | Northrup | |
| 3,433,765 A | 3/1969 | Geipel | |
| 3,715,334 A | 2/1973 | Karstedt | |
| 3,814,730 A | 6/1974 | Karstedt | |
| 3,817,894 A | 6/1974 | Butler et al. | |
| 3,839,388 A | 10/1974 | Nitzsche et al. | |
| 3,923,705 A | 12/1975 | Smith | |
| 3,957,842 A | 5/1976 | Prokai et al. | |
| 3,962,160 A * | 6/1976 | Beers et al. | ............... 528/18 |
| 3,971,751 A | 7/1976 | Isayama et al. | |
| 4,020,044 A | 4/1977 | Crossan et al. | |
| 4,022,941 A | 5/1977 | Prokai et al. | |
| 4,071,498 A | 1/1978 | Frye et al. | |
| 4,147,855 A | 4/1979 | Schiller et al. | |
| 4,240,450 A | 12/1980 | Grollier et al. | |
| 4,247,445 A | 1/1981 | Smith, Jr. et al. | |
| 4,312,801 A | 1/1982 | Hiriart Bodin et al. | |
| 4,357,438 A | 11/1982 | Sattlegger et al. | |
| 4,358,558 A | 11/1982 | Shimizu | |
| 4,472,563 A | 9/1984 | Chandra et al. | |
| 4,515,834 A | 5/1985 | Fukayama et al. | |
| 4,564,693 A | 1/1986 | Reiderer | |
| 4,568,707 A | 2/1986 | Voigt et al. | |
| 4,599,438 A | 7/1986 | White et al. | |
| 4,614,760 A | 9/1986 | Homan et al. | |
| 4,655,767 A | 4/1987 | Woodard et al. | |
| 4,701,490 A | 10/1987 | Burkhardt et al. | |
| 4,824,891 A * | 4/1989 | Laurent et al. | ............... 524/264 |
| 4,902,499 A | 2/1990 | Bolich, Jr. et al. | |
| 4,902,575 A | 2/1990 | Yukimoto et al. | |

(Continued)

FOREIGN PATENT DOCUMENTS

DE 3217516 A1 11/1983

(Continued)

OTHER PUBLICATIONS

English language abstract for DE 3217516 extracted from espacenet.com database dated Jul. 15, 2008.

(Continued)

*Primary Examiner*—Ling-Siu Choi
*Assistant Examiner*—Chun-Cheng Wang
(74) *Attorney, Agent, or Firm*—Howard & Howard Attorneys PLLC

(57) ABSTRACT

A moisture curable composition capable of cure to an elastomeric body comprising
(a) a diluted polymer comprising
   (i) a silicon containing polymer of the formula
   $$X-A-X^1$$
where X and $X^1$ are independently selected from silyl groups which contain one or more condensable substituents per group and A is a polymeric chain having a number average molecular weight ($M_n$) of at least 132 000; and a degree of polymerisation of at least 1800.
   (ii) an organic extender and/or plasticiser
   which diluted polymer is obtained by polymerisation in the presence of the said organic extender and/or plasticiser
(b) a suitable cross-linking agent which comprises at least two groups which are reactable with the condensable groups in the diluted polymer,
(c) a suitable condensation catalyst and optionally
(e) one or more fillers.

19 Claims, No Drawings

U.S. PATENT DOCUMENTS

| | | | |
|---|---|---|---|
| 4,906,707 A | 3/1990 | Yukimoto et al. | |
| 4,965,311 A | 10/1990 | Hirose et al. | |
| 4,985,476 A | 1/1991 | Endres et al. | |
| 5,043,012 A | 8/1991 | Shinohara et al. | |
| 5,063,270 A | 11/1991 | Yukimoto et al. | |
| 5,175,325 A | 12/1992 | Brown et al. | |
| 5,300,612 A | 4/1994 | Saruyama | |
| 5,863,976 A | 1/1999 | Schneider | |
| 5,914,382 A | 6/1999 | Friebe et al. | |
| 5,973,060 A | 10/1999 | Ozaki et al. | |
| 5,981,680 A | 11/1999 | Petroff et al. | |
| 6,545,104 B1 | 4/2003 | Mueller et al. | |
| 6,833,407 B1 | 12/2004 | Ahmed et al. | |
| 2003/0105260 A1 | 6/2003 | Cook et al. | |
| 2004/0122199 A1 | 6/2004 | Scheim et al. | |
| 2005/0054765 A1 | 3/2005 | Putzer | |

FOREIGN PATENT DOCUMENTS

| | | |
|---|---|---|
| DE | 3342027 C1 | 5/1985 |
| DE | 3342026 A1 | 7/1985 |
| EP | 0196565 A1 | 10/1986 |
| EP | 0277740 A2 | 8/1988 |
| EP | 0315333 A2 | 5/1989 |
| EP | 0378420 A2 | 7/1990 |
| EP | 0382365 A2 | 8/1990 |
| EP | 0397036 A2 | 11/1990 |
| EP | 0537785 A1 | 4/1993 |
| EP | 0651022 A2 | 5/1995 |
| EP | 0679674 A2 | 11/1995 |
| EP | 0801101 A1 | 10/1997 |
| EP | 0802233 A2 | 10/1997 |
| EP | 0842974 A1 | 5/1998 |
| EP | 0860459 A2 | 8/1998 |
| EP | 0860461 A2 | 8/1998 |
| EP | 0885921 A2 | 12/1998 |
| EP | 0909778 A1 | 4/1999 |
| EP | 1008598 A2 | 6/2000 |
| EP | 1041119 A2 | 10/2000 |
| EP | 1138715 A1 | 10/2001 |
| EP | 1254192 B1 | 8/2004 |
| GB | 895091 | 5/1962 |
| GB | 918823 | 2/1963 |
| GB | 1289526 | 9/1972 |
| GB | 1490240 | 10/1977 |
| GB | 2012789 A | 8/1979 |
| GB | 2041955 A | 9/1980 |
| GB | 2252975 A | 8/1992 |
| WO | WO 99/06473 A1 | 2/1999 |
| WO | WO 99/65979 A1 | 12/1999 |
| WO | WO 99/66012 A2 | 12/1999 |
| WO | WO 00/27910 A1 | 5/2000 |
| WO | WO 01/53425 A2 | 7/2001 |
| WO | WO 01/79330 A1 | 10/2001 |
| WO | WO 02/062893 A2 | 8/2002 |
| WO | WO 03/006530 A1 | 1/2003 |
| WO | WO 03/074634 A2 | 9/2003 |
| WO | WO 2005/103117 A1 | 11/2005 |

OTHER PUBLICATIONS

English language abstract for DE 3342026 extracted from espacenet.com database dated Jul. 15, 2008.
English language abstract for DE 3342027 extracted from espacenet.com database dated Jul. 15, 2008.
English language abstract for EP 0043501 extracted from delphion.com database dated Jul. 22, 2008.
English language abstract for EP 0093918 extracted from espacenet.com database dated Jul. 18, 2008.
English language abstract for EP 0215470 extracted from delphion.com database dated Jul. 22, 2008.
English language abstract for EP 0801101 extracted from espacenet.com database dated Jul. 15, 2008.
English language abstract for EP 0807667 extracted from espacenet.com database dated Jul. 15, 2008.
English language abstract for EP 0885921 extracted from espacenet.com database dated Jul. 18, 2008.
PCT International Search Report for PCT/GB2006/050075, Jul. 28, 2006, 4 pages.
PCT International Search Report for PCT/GB2006/050074, Aug. 2, 2006, 4 pages.
PCT International Search Report for PCT/GB2006/050072, Jul. 21, 2006, 4 pages.
PCT International Search Report for PCT/GB2006/050073, Aug. 2, 2006, 5 pages.
PCT International Search Report for PCT/EP2006/061285, Jul. 28, 2006, 4 pages.

* cited by examiner

ORGANOSILOXANE COMPOSITIONS

RELATED APLLICATIONS

This application claims priority to and all the advantages of International Patent Application No. PCT/US2006/011986, filed on Apr. 3, 2006, which claims priority to Great Britain Patent Application Nos. GB 0506939.8 and GB 0516239.1, filed on Apr. 6, 2005 and Aug. 6, 2005, respectively.

This invention is concerned with sealant compositions comprising high molecular weight silicon containing polymers having condensable terminal groups which have been polymerised in the presence of an extender and/or plasticiser.

The rheological properties of uncured polymers are primarily a function of their viscosities. In general the lower the viscosity of a polymer the higher the extrusion rate of uncured compositions which contain the polymer. The viscosity of an uncured polymer is directly related to the molecular weight of the polymer and the length of the polymer chain, usually defined as the degree of polymerisation (dp). The viscosity of the uncured polymer is also a major influence on several of the physical properties of compositions incorporating the polymer such as, for example, sealant compositions, when such compositions are subsequently cured.

Organosiloxane compositions which cure to elastomeric solids are well known and such compositions can be produced to cure at either room temperature in the presence of moisture or with application of heat. Typically those compositions which cure at room temperature in the presence of moisture are obtained by mixing a polydiorganosiloxane based polymer having reactive terminal groups, with a suitable silane (or siloxane) based cross-linking agent in the presence of one or more fillers and a curing catalyst. These compositions are typically either prepared in the form of one-part compositions curable upon exposure to atmospheric moisture at room temperature or two part compositions curable upon mixing at room temperature and pressure.

One important application of the above-described curable compositions is their use as sealants. In use as a sealant, it is important that the composition has a blend of properties which render it capable of being applied as a paste to a joint between substrate surfaces where it can be worked, prior to curing, to provide a smooth surfaced mass which will remain in its allotted position until it has cured into an elastomeric body adherent to the adjacent substrate surfaces. Typically sealant compositions are designed to cure quickly enough to provide a sound seal within several hours but at a speed enabling the applied material to be tooled into a desired configuration shortly after application. The resulting cured sealant is generally formulated to have a strength and elasticity appropriate for the particular joint concerned.

The introduction of an inorganic filler into an elastomeric composition containing an organopolysiloxane containing polymer is often required to obtain useful tear, durometer, elongation and modulus at 100% elongation properties. The rheological properties of an uncured elastomer are dependent on filler properties (when a filler is present in the composition) such as filler concentration and structure and the degree of polymer-filler interaction as well as the viscosity of the polymer. In general the lower the viscosity of the uncured organopolysiloxane containing composition, optionally containing filler, the higher the extrusion rate of the uncured composition. As a result applications requiring high extrusion rates such as uncured sealants, which in use, are generally extruded manually using a sealant gun or the like, need to typically be of relatively low viscosity (e.g. <100 000 mPa·s at 25° C.) to ensure suitable composition extrusion rates for manual end uses.

The physical properties of the resulting cured composition affected include elongation and modulus at 100% elongation, both of which are particularly important for sealants used in for example expansion joints in the construction and transportation industries, where the need for sealants with low modulus and high elongation are essential.

Hence, whilst it is known that increasing the molecular weight of a polymer would improve some physical properties of a sealant typically the maximum viscosity used in current formulations are in practice no greater than about 150 000 mPa·s at 25° C. Whilst polymers having viscosities of up to 1,000,000 mPa·s at 25° C. have been discussed in the prior art the use of polymers having such viscosities has been practically unmanageable. Hence, whilst it is known increasing the molecular weight of the polymer would improve the some properties of the sealant typically the maximum viscosity used in current formulations are in practice no greater than about 150 000 mPa·s at 25° C.

One method which has been used to increase the molecular weight of the polymer whilst maintaining sufficiently low extrusion rates to enable the composition to be manually extruded using e.g. sealant guns or the like is the provision of chain extenders in the uncured composition. The chain extender is mixed with a pre-prepared polymer and all the other composition ingredients and the composition is stored in an air tight manner. Upon exposure to moisture the molecular weight of the polymer is increased because the chosen chain extender is selected because it is known to react at a faster rate with polymer terminal groups than the cross-linker provided in the composition. Examples of such methods are described in U.S. Pat. No. 6,833,407, U.S. Pat. No. 4,020,044, US2004/0122199 and U.S. Pat. No. 5,300,612.

It has become common practice in the formulation of silicone based compositions used as room temperature cure sealants, to include additives which serve to "extend" and/or "plasticise" the silicone sealant composition by blending the or each extending compound (henceforth referred to as an "extender") and/or plasticising compound (henceforth referred to as a "plasticiser") with the pre-prepared polymer and other ingredients of the composition.

An extender (sometimes also referred to as a process aid or secondary plasticiser) is used to dilute the sealant composition and basically make the sealant more economically competitive without substantially negatively affecting the properties of the sealant formulation. The introduction of one or more extenders into a silicone sealant composition not only reduces the overall cost of the product but can also affect the properties of resulting uncured and/or cured silicone sealants. The addition of extenders can, to a degree, positively effect the rheology, adhesion and clarity properties of a silicone sealant and can cause an increase in elongation at break and a reduction in hardness of the cured product both of which can significantly enhance the lifetime of the cured sealant provided the extender is not lost from the cured sealant by, for example, evaporation or exudation.

A plasticiser (otherwise referred to as a primary plasticiser) is added to a polymer composition to provide properties within the final polymer based product to increase the flexibility and toughness of the final polymer composition. This is generally achieved by reduction of the glass transition temperature ($T_g$) of the cured polymer composition thereby generally, in the case of sealants for example, enhancing the elasticity of the sealant which in turn enables movement capabilities in a joint formed by a silicone sealant with a significant decrease in the likelihood of fracture of the bond formed between sealant and substrate when a sealant is applied thereto and cured. Plasticisers are typically used to also reduce the modulus of the sealant formulation. Plasticisers may reduce the overall unit cost of a sealant but that is not their main intended use and indeed some plasticisers are expensive and could increase the unit cost of a sealant formulation in which they are used. Plasticisers tend to be generally less volatile than extenders and are typically introduced into the polymer composition in the form of liquids or low melting point solids (which become miscible liquids during processing. Typically, for silicone based composition plasticisers are unreactive short chain siloxanes such as polydimethylsiloxane having terminal triorganosiloxy groups wherein the organic substituents are, for example, methyl, vinyl or phenyl or combinations of these groups. Such polydimethylsiloxanes normally have a viscosity of from about 5 to about 100,000 mPa·s. Compatible organic plasticisers may additionally be used, examples include dialkyl phthalates wherein the alkyl group may be linear and/or branched and contains from six to 20 carbon atoms such as dioctyl, dihexyl, dinonyl, didecyl, diallanyl and other phthalates; adipate, azelate, oleate and sebacate esters, polyols such as ethylene glycol and its derivatives, organic phosphates such as tricresyl phosphate and/or triphenyl phosphates, castor oil, tung oil, fatty acids and/or esters of fatty acids.

Typically plasticisers are more compatible with polymer compositions than extenders and tend to be significantly less volatile and as such are significantly more likely to remain at high levels within the polymer matrix after curing.

Extenders need to be both sufficiently compatible with the remainder of the composition and as non-volatile as possible at the temperature at which the resulting cured sealant is to be maintained (e.g. room temperature). However it has been found that whilst some proposed extenders are effective during storage, at the time of application of the sealant and at least for a time thereafter, there are several well known problems regarding their use. These include:—
  (i) UV stability—the discolouring of cured sealants containing extenders upon prolonged exposure to UV light;
  (ii) Poor compatibility with the polymer composition (e.g. a sealant composition) leading to their exuding from the sealant over time which negatively effects the physical and aesthetic properties and lifetime of the cured product e.g. sealant; and
  (iii) Staining of the surrounding substrates onto which the extenders exude from the composition.

As previously mentioned the process used in the industry, for introducing extenders and/or plasticisers into a polymer composition such as a sealant composition, consists of merely mixing all the pre-prepared ingredients, e.g. polymer, crosslinker, catalyst, filler and the or each extender and/or plasticiser together in appropriate amounts and orders of addition. Compatibility of organic extenders and/or plasticisers with the other ingredients in a silicone based polymer composition, is a significantly greater problem than with respect to organic based polymers, silicone polymers into which the extenders and/or plasticisers are introduced tend to be highly viscous polymers, and the chemical nature of the polymer being silicone based as opposed to organic based can have significant effects on the compatibility. The level of compatibility effectively determines the amount of extender and/or plasticiser which can be introduced into a polymer composition. Typically this results in the introduction of significantly lower amounts of, in particular, extenders into the composition than may be desired because the extender will not physically mix into the polymer composition sufficiently well, particularly with the pre-formed polymer which is usually the largest component, other than the filler, in the composition. The problem of compatibility of plasticisers and extenders in silicone polymer compositions has been a known in the industry ever since the introduction of organic extenders, which as far the inventors are aware, until the present invention has not been addressed other than by the proposal of an ever increasing number of organic based extenders.

DE3342026 describes a process involving the physical blending of a portion of pre-formed organosilicone polymer together with some or all of the plasticiser. The physical blending of polymer and plasticiser is exemplified in the examples using an alpha omega dihydroxypolydimethylsiloxane having a viscosity of merely about 80 000 mPa·s at 20° C. thereby avoiding the problems which the present inventors have addressed and which would be encountered using such a physical blending process for high viscosity polymers wherein such a blending process would involve very expensive mixing equipment for long time periods of time to obtain anything like a suitable blend rendering such a process economically unviable and most likely not provide a suitable blend.

Historically, unreactive siloxanes such as trialkylsilyl terminated polydiorganosiloxanes (for example trimethylsilyl terminated polydimethyl siloxane (PDMS)) were originally used as extenders and/or plasticisers in silicone based sealants because they were chemically similar and had excellent compatibility.

A wide variety of organic compounds and compositions have been proposed for use as extenders for reducing the cost of the silicone sealant compositions. These materials are generally classified into two groups as high volatility extenders and low volatility extenders.

Compositions containing high volatility extenders may contain e.g. toluene or xylene. The high volatility of these compounds causes a number of disadvantages in sealant formulations including, high shrinkage (high volume loss due to evaporation of the solvent), flammability, VOC (volatile organic content), hazardous component labelling, health and safety issues, etc.

Low volatility extenders (sometimes referred to as higher molecular weight extenders), are chosen with the intention of having good compatibility with the polymers in the sealant compositions. These higher molecular weight extenders can completely or partially replace the PDMS plasticizer in the formulation.

Low molecular weight polyisobutylenes (PIB) are proposed as extenders in DE 2364856 and DE 3217516, however, due to the limited compatibility, the maximum amount of PIB extender that can be added to an acetoxy silicone sealant formulation is typically in the 25-30% (by weight) range. A higher addition level causes the extender to bleed to the surface and makes the cured sealant surface sticky. Phosphate esters are described as potential extenders in DE 2802170 and DE 2653499.

Mineral oil fractions (e.g. isoparaffins) and polyalkylbenzenes such as heavy alkylates (alkylated aromatic materials remaining after distillation of oil in a refinery) have also been proposed as extenders. These and other organic compounds and mixtures proposed as extender materials for silicone sealant compositions are described in the following publications:—

GB2041955 describes the use of dodecyl benzene and other alkylarenes as organic extenders. GB2012789 describes the use of trioctyl phosphate for the partial replacement of PDMS. DE3342026 and DE3342027 describe the use of esters of aliphatic monocarboxylic acids as extenders.

EP0043501 proposes the use of between 0.2 and 15% by weight of the sealant composition of branched and/or cyclic paraffin hydrocarbons such as cyclohexane, isohexane and isooctodecane. EP0801101 describes the use of a mixture of paraffin oils (molecular weight>180) in combination with one or more alkyl aromatic compounds. EP0842974 describes the use of alkylcyclohexanes (molecular weight>220). WO99/66012 and WO 00/27910 describe oil resistant silicone compositions containing one or more aliphatic liquid polymers and oils, petroleum derived organic oils, alkyl phosphates, polyalkylene glycol, poly(propylene oxides), hydroxyethylated alkyl phenol, dialkyldithiophosphonate, poly(isobutylenes), poly(a-olefins) and mixtures thereof as extenders.

In recent years the industry has increasingly used paraffinic hydrocarbons as extenders. EP0885921 describes the use of paraffinic hydrocarbon mixtures containing 60 to 80% paraffinic and 20 to 40% naphthenic and a maximum of 1% aromatic carbon atoms. EP0807667 appears to describe a similar extender comprising wholly or partially of a paraffin oil comprising 36-40% cyclic paraffin oils and 58 to 64% non-cyclic paraffin oils. WO99/65979 describes an oil resistant sealant composition comprising a plasticiser which may include paraffinic or naphthenic oils and mixtures thereof amongst other plasticisers. EP1481038 describes the use of a hydrocarbon fluid containing more than 60 wt. % naphthenics, at least 20 wt. % polycyclic naphthenics and an ASTM D-86 boiling point of from 235 to 400° C. EP1252252 describes the use of an extender comprising a hydrocarbon fluid having greater than 40 parts by weight cyclic paraffinic hydrocarbons and less than 60 parts by weight monocyclic paraffinic hydrocarbons based on 100 parts by weight of hydrocarbons. EP1368426 describes a sealant composition for use with alkyd paints containing a liquid paraffinic hydrocarbon "extender" which preferably contains greater than 40% by weight of cyclic paraffins.

As mentioned above a fundamental problem with the use of extending materials is their lack of compatibility with components in the uncured silicone sealant composition typically resulting in phase separation during storage and exudation from the cured sealant over the complete temperature range of interest. It is commonly found that, after curing, extended sealants exude extender resulting in a significant reduction in the lifetime of the cured sealant, a feature particularly prevalent with extenders having low boiling points, e.g. <100° C. Whilst it is in the interest of the manufacturer to incorporate a high loading of extender into their sealant compositions, the physical mixing of the extender material with the other ingredients as advocated in all of the above documents is prevented through the lack of compatibility particularly with respect to high viscosity polymers where the viscous properties of the polymer component are a physical barrier to the incorporation of large volumes of extender into the sealant compositions. It is generally found therefore that the amount of extender, which may be incorporated into the sealant composition, is typically between 20 and 40% by weight dependent on the extender or combination of extenders used.

Whilst many of the organic extenders proposed above have potential they all generally have problems for example whilst alkylbenzene extenders have a seemingly suitable combination of properties, i.e. high boiling points, excellent compatibility with the polydiorganosiloxane polymer matrix (resulting in cured silicone sealants of good to excellent transparency), low environmental impact, low vapour pressure (and therefore low shrinkage), positive effect on the rheological properties (reduced stringing). However, when exposed to artificial or natural weathering, alkyl benzene extended sealants tend to yellow rather rapidly. After prolonged weathering, these extended sealants continue to yellow, and also lose their transparency. This problem does not occur with other extenders, such as phosphate esters or polyisobutylene.

Furthermore, whilst the use of polymers with very high degrees of polymerisation in siloxane formulations, can result in several advantageous properties such as high elasticity the viscosity of such polymers is generally so great (i.e. silicone gums) that they become either completely unmanageable with respect to inter-mixing with other ingredients, such as fillers, cross-linkers, extenders and/or plasticisers, or require very high shear mixers which are expensive to operate and would be almost certain to fail to provide an even dispersion of the composition constituents (particularly filler and extender and/or plasticiser) in the polymer. There has therefore been a long-felt need within the industry to develop a process for the ease of introduction of silicone based polymers of very high degrees of polymerisation into compositions whilst avoiding the need for high cost equipment.

In accordance with the present invention there is provided a moisture curable composition capable of cure to an elastomeric body comprising
(a) a diluted polymer comprising
  (i) a silicon containing polymer of the formula

X-A-X$^1$ where X and X$^1$ are independently selected from silyl groups which contain one or more condensable substituents per group and A is a polymeric chain having a number average molecular weight ($M_n$) of at least 132 000; and a degree of polymerisation of at least 1800.
  (ii) an organic extender and/or plasticiser
  which diluted polymer is obtained by polymerisation in the presence of the said organic extender and/or plasticiser
(b) a suitable cross-linking agent which comprises at least two groups which are reactable with the condensable groups in the diluted polymer,
(c) a suitable condensation catalyst and optionally
(e) one or more fillers.

The concept of "comprising" where used herein is used in its widest sense to mean and to encompass the notions of "include" and "consist of".

For the sake of clarification, the term "monomer" and derivatives thereof are used herein to mean a monomer or oligomer starting material involved in a polymerisation process.

Preferably each extender and or plasticiser is miscible or at least substantially miscible with the monomeric starting materials with which they are initially mixed, and more particularly with both intermediate polymerisation reaction products and the final polymerisation product. The term "Substantially miscible extenders and/or plasticisers" are intended to include extenders and/or plasticisers which are completely or largely miscible with the monomer(s) and/or the reaction mixture during polymerisation and hence may include low melting point solids which become miscible liquids in a reaction mixture during the polymerisation process.

An organosiloxane containing polymer is intended to mean a polymer comprising multiple organopolysiloxane groups per molecule and is intended to include a polymer substantially containing only organopolysiloxane groups in the polymer chain or polymers where the backbone contains both organopolysiloxane groups and e.g. organic polymeric groups in chain.

The diluted polymer comprises a polymer component which in accordance with the present invention is a silicon containing polymer having a number average molecular weight ($M_n$) of at least 132 000 as determined following ASTM D5296-05 and calculated as polystyrene molecular weight equivalents and a degree of polymerisation of at least 1800. For organopolysiloxane polymers an $M_n$ value of 132 000 equate to a weight averaged molecular weight ($M_w$) of 198,000. and would typically have a viscosity of greater than 1000000 mPa·s at 25° C.

Preferably the silicon containing polymer is an organosiloxane containing polymer preferably having the following general formula $$X^1\text{-}A\text{-}X^2 \quad (1)$$

where $X^1$ and $X^2$ suitable silicon containing condensable groups and A is a siloxane polymeric chain, an organic polymeric chain, a siloxane copolymeric chain or a siloxane/organic block copolymeric chain.

Each $X^1$ or $X^2$ group contains a suitable condensable substituent which is chosen to react with the chosen cross-linker via a condensation reaction. For the avoidance of doubt condensation is a reaction between reactants which result in the elimination of low molecular weight by-product(s) such as water, ammonia or methanol etc.

The sort of reaction envisaged between the condensable end groups of the polymer and the cross-linker are most preferably generally linked to the interaction of compounds having hydroxyl and/or hydrolysable end groups which can interact with the release of e.g. water or methanol or the like. However, the following list indicates other interactions which might be considered for the cure process of the composition in accordance with the present invention:—
1) the condensation of organohalosilyl groups with an organoalkoxysilyl groups,
2) the condensation of organohalosilyl groups with organoacyloxysilyl groups,
3) the condensation of organohalosilyl groups with organosilanols,
4) the condensation of organohalosilyl groups with silanolates,
5) the condensation of organo-hydrosilyl groups with organosilanol groups
6) the condensation of organoalkoxysilyl groups with organoacyloxysilyl groups
7) the condensation of organoalkoxysilyl groups with organosilanol groups,
8) the condensation of organoaminosilyl groups with organosilanols,
9) the condensation of organoacyloxysilyl groups silanolate groups
10) the condensation of organoacyloxysilyl groups with organosilanols,
11) the condensation of organooximosilyl groups with organosilanol groups
12) the condensation of organoenoxysilyl groups with organosilanols,
13) The condensation of a siloxane compound comprising one or more hydrosilane functional groups with a siloxane compounds containing at least one alkoxysilane functional group, generating hydrocarbon by-products.

However preferably $X^1$ or $X^2$ are silyl groups comprising hydroxyl-terminating or hydrolysable substituents such as —SiOH$_3$, —(R$^a$)SiOH$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2. Suitably, $X^1$ and/or $X^2$ are groups which are hydrolysable in the presence of moisture.

In one embodiment a proportion (up to 20%) of $X^2$ groups may be trialkylsilyl groups.

Examples of suitable siloxane containing polymeric chain A in formula (I) are those which comprise a polydiorganosiloxane chain. Thus group A preferably includes siloxane units of formula (2)

$$—(R^5{}_s SiO_{(4-s)/2})— \quad (2)$$

in which each R$^5$ is independently an organic group such as a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably R$^5$ is a hydrocarbyl group having from 1 to 10 carbon atoms optionally substituted with one or more halogen group such as chlorine or fluorine and s is 0, 1 or 2. Particular examples of groups R$^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups R$^5$ are methyl.

Polymeric chain A in the compound of formula (1) may include any suitable siloxane or siloxane/organic molecular chain providing the resulting polymer a viscosity (in the absence of diluents in accordance with the present invention of up to at least 20 000 000 mPa·s, at 25° C. (i.e. a degree of polymerisation (dp) of up to or even more than 200 000 units of formula (2)). In one preferred embodiment polymeric chain A is a linear organopolysiloxane molecular chain (i.e. s=2) for all chain units. Preferred materials have polydiorganosiloxane chains according to the general formula (3)

$$—(R^5{}_2 SiO)_t— \quad (3)$$

in which each R$^5$ is as defined above and is preferably a methyl group and t has a value of up to 200 000. Suitable polymers have viscosities of up to at least 20 000 000 mPa·s at 25° C. in the absence of the extender(s) but when prepared in the presence of the extender(s) viscosities are generally in the order of 1000 to 100 000 mPa·s at 25° C. because of the presence of the extender(s) in the polymer matrix. The polydiorganosiloxanes may be homopolymers or copolymers. Mixtures of different polydiorganosiloxanes having terminal condensable groups are also suitable.

Whilst polymeric chain A is preferably exclusively an organopolysiloxane chain, polymeric chain A may alternatively be a block copolymeric chain comprising at least one block of siloxane groups of the type depicted in formula (2) above and an organic component comprising any suitable organic based polymer backbone for example the organic polymer backbone may comprise, for example, polystyrene and/or substituted polystyrenes such as poly(α-methylstyrene), poly(vinylmethylstyrene), poly(p-trimethylsilylstyrene) and poly(p-trimethylsilyl-α-methylstyrene). Other organic components which may be incorporated in the polymeric chain A may include acetylene terminated oligophenylenes, vinylbenzyl terminated aromatic polysulphones oligomers, aromatic polyesters, aromatic polyester based monomers, polyalkylenes, polyurethanes, aliphatic polyesters, aliphatic polyamides and aromatic polyamides and the like.

However perhaps the most preferred organic based polymeric blocks in A are polyoxyalkylene based blocks. Such polyoxyalkylene blocks preferably comprise a linear predominantly oxyalkylene polymer comprised of recurring oxyalkylene units, ($-C_nH_{2n}-O-$) illustrated by the average formula ($-C_nH_{2n}-O-$)$_y$ wherein n is an integer from 2 to 4 inclusive and y is an integer of at least four. The number average molecular weight of each polyoxyalkylene polymer block may range from about 300 to about 10,000. Moreover, the oxyalkylene units are not necessarily identical throughout the polyoxyalkylene monomer, but can differ from unit to unit. A polyoxyalkylene block, for example, can be comprised of oxyethylene units, ($-C_2H_4-O-$); oxypropylene units ($-C_3H_6-O-$); or oxybutylene units, ($-C_4H_8-O-$); or mixtures thereof.

Other polyoxyalkylene blocks may include, for example, units of the structure—

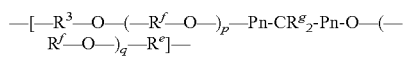

in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is, a hydrogen atom or methyl group and each of the subscripts p and q is a positive integer in the range from 3 to 30. Alternatively A may solely comprise an organic based polymeric chain in which case A may comprise any of the organic polymeric chains discussed above in respect to block copolymers.

Any suitable extenders or combination of extenders may be utilised as the extender in the extended polymer.

These include each of the following alone or in combination with others from the list:—trialkylsilyl terminated polydialkyl siloxane where the alkyl groups are preferably methyl groups;

polyisobutylenes (PIB), phosphate esters such as trioctyl phosphate polyalkylbenzenes, linear and/or branched alkylbenzenes such as heavy alkylates, dodecyl benzene and other alkylarenes, esters of aliphatic monocarboxylic acids;

unreactive short chain siloxanes linear or branched mono unsaturated hydrocarbons such as linear or branched alkenes or mixtures thereof containing from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise from 5 to 25 carbon atoms per molecule.

Preferred extenders include the mineral oil fractions, alkylcycloaliphatic compounds, and alkybenzenes including polyalkylbenzenes.

Other preferred mineral oil extenders include alkylcycloaliphatic compounds and alkybenzenes including polyalkylbenzenes.

Any suitable mixture of mineral oil fractions may be utilised as the extender in the present invention but high molecular weight extenders (e.g. a number average molecular weight>220) are particularly preferred. Examples include:— alkylcyclohexanes (having a number average molecular weight>220);

paraffinic hydrocarbons and mixtures thereof containing from 1 to 99%, preferably from 15 to 80% n-paraffinic and/or isoparaffinic hydrocarbons (linear branched paraffinic) and 1 to 99%, preferably 85 to 20% cyclic hydrocarbons (naphthenic) and a maximum of 3%, preferably a maximum of 1% aromatic carbon atoms. The cyclic paraffinic hydrocarbons (naphthenics) may contain cyclic and/or polycyclic hydrocarbons. Any suitable mixture of mineral oil fractions may be used, e.g. mixtures containing
  (i) 60 to 80% paraffinic and 20 to 40% naphthenic and a maximum of 1% aromatic carbon atoms;
  (ii) 30-50%, preferably 35 to 45% naphthenic and 70 to 50% paraffinic and or isoparaffinic oils;
  (iii) hydrocarbon fluids containing more than 60 wt. % naphthenics, at least 20 wt. % polycyclic naphthenics and an ASTM D-86 boiling point of greater than 235° C.;
  (iv) hydrocarbon fluid having greater than 40 parts by weight naphthenic hydrocarbons and less than 60 parts by weight paraffinic and/or ispoaraffinic hydrocarbons based on 100 parts by weight of hydrocarbons.

Preferably the mineral oil based extender or mixture thereof comprises at least one of the following parameters:—
  (i) a molecular weight of greater than 150, most preferably greater than 200;
  (ii) an initial boiling point equal to or greater than 230° C. (according to ASTM D 86).
  (iii) a viscosity density constant value of less than or equal to 0.9; (according to ASTM 2501)
  (iv) an average of at least 12 carbon atoms per molecule, most preferably 12 to 30 carbon atoms per molecule;
  (v) an aniline point equal to or greater than 70° C., most preferably the aniline point is from 80 to 110° C. (according to ASTM D 611);
  (vi) a naphthenic content of from 20 to 70% by weight of the extender and a mineral oil based extender has a paraffinic content of from 30 to 80% by weight of the extender according to ASTM D 3238);
  (vii) a pour point of from −50 to 60° C. (according to ASTM D 97);
  (viii) a kinematic viscosity of from 1 to 20 cSt at 40° C. (according to ASTM D 445)
  (ix) a specific gravity of from 0.7 to 1.1 (according to ASTM D1298);
  (x) a refractive index of from 1.1 to 1.8 at 20° C. (according to ASTM D 1218)
  (xi) a density at 15° C. of greater than 700 kg/m$^3$ (according to ASTM D4052) and/or
  (xii) a flash point of greater than 100° C., more preferably greater than 110° C. (according to ASTM D 93)
  (xiii) a saybolt colour of at least +30 (according to ASTM D 156)
  (xiv) a water content of less than or equal to 250 ppm (according to ASTM D6304)
  (xv) a Sulphur content of less than 2.5 ppm (according to ASTM D 4927)

The alkylbenzene compounds suitable for use include heavy alkylate alkylbenzene or an alkylcycloaliphatic compound. Examples of alkyl substituted aryl compounds useful as extenders and/or plasticisers are compounds which have aryl groups, especially benzene substituted by alkyl and possibly other substituents, and a molecular weight of at least 200. Examples of such extenders are described in U.S. Pat. No. 4,312,801, the content of which is incorporated herein by reference. These compounds can be represented by general formula (I), (II), (III) and (IV)

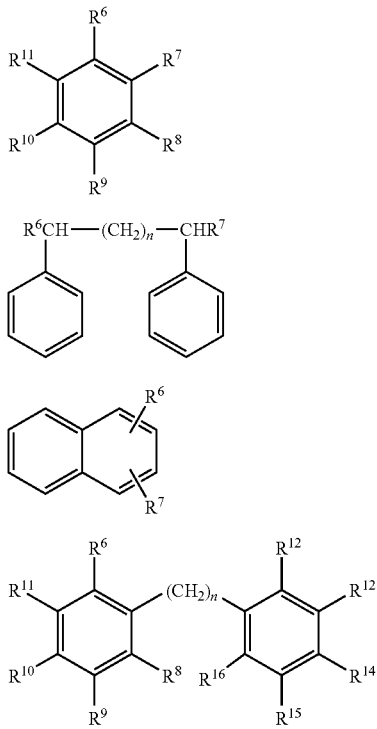

where $R^6$ is an alkyl chain of from 1 to 30 carbon atoms, each of $R^7$ through to $R^{16}$ is independently selected from hydrogen, alkyl, alkenyl, alkynyl, halogen, haloalkyl, nitrile, amine, amide, an ether such as an alkyl ether or an ester such as an alkyl ester group, and n is an integer of from 1 to 25.

In particular, the extender used in accordance with the process of the present invention is of formula (I) where each of $R^7$, $R^8$, $R^9$, $R^{10}$ and $R^{11}$ is hydrogen and $R^6$ is a $C_{10}$-$C_{13}$ alkyl group. A particularly useful source of such compounds are the so-called "heavy alkylates", which are recoverable from oil refineries after oil distillation. Generally distillation takes place at temperatures in the range of from 230-330° C., and the heavy alkylates are present in the fraction remaining after the lighter fractions have been distilled off.

Examples of alkylcycloaliphatic compounds are substituted cyclohexanes with a molecular weight in excess of 220. Examples of such compounds are described in EP 0842974, the content of which is incorporated herein by reference. Such compounds may be represented by general formula (V).

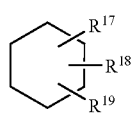

where $R^{17}$ is a straight or branched alkyl group of from 1 to 25 carbon atoms, and $R^{18}$ and $R^{19}$ are independently selected from hydrogen or a $C_{1-25}$ straight or branched chain alkyl group.

The amount of diluent which may be included in the composition will depend upon factors such as the purpose to which the composition is to be put, the molecular weight of the diluent(s) concerned etc. Polymer products in accordance with the present invention may contain from 5% w/w up to 70% w/w diluent (based on the combined weight of polymer and diluent(s)) depending upon these factors. In general however, the higher the molecular weight of the diluent(s), the less will be tolerated in the composition. Typical compositions will contain up to 70% w/w diluent(s). More suitable polymer products comprise from 30-60% w/w of a linear diluent(s) whereas 25-35% w/w will be more preferred when the diluent is a heavy alkylate.

Most preferably the extender comprises a mineral oil fraction.

Any suitable cross-linker may be used provided it is able to participate in condensation reaction with the polymer. The cross-linker (b) used in the moisture curable composition as hereinbefore described is preferably a silane or siloxane compound containing at least two and preferably at least 3 hydroxyl and/or hydrolysable groups. These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

The cross-linker may have two but preferably has three or four silicon-bonded condensable (preferably hydrolysable) groups per molecule. When the cross-linker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

The amount of cross-linker present in the composition will depend upon the particular nature of the cross-linker and in particular, the molecular weight of the molecule selected. The compositions suitably contain cross-linker in at least a stoichiometric amount as compared to the polymeric material described above. Compositions may contain, for example, from 2-30% w/w of cross-linker, but generally from 2 to 10% w/w. Acetoxy cross-linkers may typically be present in amounts of from 3 to 8% w/w preferably 4 to 6% w/w whilst oximino cross-linkers, which have generally higher molecular weights will typically comprise from 3-8% w/w.

The composition further comprises a condensation catalyst. The catalyst chosen for inclusion in a particular silicone sealant composition depends upon the speed of cure required. Any suitable condensation catalyst may be utilised to cure the composition including tin, lead, antimony, iron, cadmium, barium, manganese, zinc, chromium, cobalt, nickel, titanium, aluminium, gallium or germanium and zirconium based catalysts such as organic tin metal catalysts and 2-ethylhexoates of iron, cobalt, manganese, lead and zinc may alternatively be used. Organotin, titanate and/or zirconate based catalysts are preferred.

Silicone sealant compositions which contain oximosilanes or acetoxysilanes generally use a tin catalyst for curing, such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate. Dibutyltin dilaurate, dibutyltin diacetate are particularly preferred.

For compositions which include alkoxysilane cross-linker compounds, the preferred curing catalysts are titanate or zirconate compounds. Such titanates may comprise a compound according to the general formula $Ti[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{22}$ include but are not restricted to methyl, ethyl, propyl, isopropyl, butyl, tertiary butyl and a branched secondary alkyl group such as 2,4-dimethyl-3-pentyl. Preferably, when each $R^{22}$ is the same, $R^{22}$ is an isopropyl, branched secondary alkyl group or a tertiary alkyl group, in particular, tertiary butyl. Examples include tetrabutyltitanate, tetraisopropyltitanate, or chelated titanates or zirconates such as for example diisopropyl bis(acetylacetonyl)titanate, diisopropyl bis(ethylacetoacetonyl)titanate, diisopropoxytitanium Bis(Ethylacetoacetate) and the like. Further examples of suitable catalysts are described in EP1254192 which is incorporated herein by reference. The amount of catalyst used depends on the cure system being used but typically is from 0.01 to 3% by weight of the total composition Alternatively, the titanate may be chelated. The chelation may be with any suitable chelating agent such as an alkyl acetylacetonate such as methyl or ethylacetylacetonate. The catalyst may therefore comprise a mixture or reaction product of (i) $M(OR)_4$ or (ii) $M(OR')_x(Z)_z$ wherein M is titanium or zirconium, each R' is the same or different and is a primary, secondary or tertiary aliphatic carbon groups or —$SiR^9_3$, in which each $R^9$ is an alkyl group having from 1 to 6 carbon atoms;

Z is a group of the formula —O—Y—O— wherein Y is an optionally branched alkylene group comprising from 1 to 8 carbon atoms; and x is 0 or 2, wherein when x is 0, z is 2 and when x is 2, z is 1;

with (iii) a compound having the general formula:

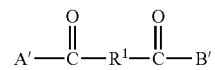

In which $R^1$ is an optionally substituted alkylene radical having from 1 to 6 carbon atoms, A' is selected from the group consisting of:

(!) —$(CX_2)_nC(R^2)_3$ wherein n is from 0 to 5, (!!) an adamantyl group and (!!!) an adamantyl derivative;

B' is selected from the group consisting of:

a") —$(CX_2)_tC(R^2)_3$, wherein t has a value of from 0 to 5, b") a monovalent alkyl group having from 1 to 6 carbon atoms, and c") $OR^3$, wherein $R^3$ is selected from (a") or (b")

each X is the same or different and is a halogen group or hydrogen;

each $R^2$ is the same or different and is X or an alkyl radical having one to eight carbon atoms These materials are produced, for example, by reacting an alcoholate as referred to above with an α- or β-diketone or a derivative thereof. More preferred are those partially chelated titanium compounds having two alcoholate groups attached to titanium. The most preferred organotitanium compounds are those wherein the two alcoholate groups are composed of more than 3 carbon atoms, for example, bis (diethyleneglycoxy)-titanium-(2,4-pentanedionate).

When Z is —O—Y—O— each oxygen atom is bound directly to the titanium atom and x is about 2. Preferably Y is an alkylene group containing 1 to 8 carbon atoms. Examples of the O—Y—O group may include 1,3-dioxypropane (O—$(CH_2)_3$—O), 2,4-dimethyl-2,4-dioxypentane (O—C$((CH_3)_2)$—$CH_2$—C$((CH_3)_2)$—O) and 2,3-dimethyl-2,3-dioxybutane (O—C$((CH_3)_2)$—C—$((CH_3)_2)$—O)

Regarding now compound (iii), preferably at least one and most preferably each X is a halogen radical. Most preferably the halogen radical is a fluorine radical. Similarly it is preferred that at least one and most preferably each $R^2$ group is a halogen radical and most preferably it is a fluorine radical or each $R^2$ group is an alkyl group, most preferably a methyl or ethyl or butyl group. In a most preferred formulation n is zero. $R^1$ is most preferably a methylene group but can have one alkyl or halogen substituted alkyl group with 1 to 5 carbon atoms. The adamantyl group is a derivative of adamantane or tricyclo-3,3,1,1-decane which is a rigid ring system based on three fused cyclohexane rings.

Examples of compound (iii) include Methyl pivaloylacetate (MPA) and Ethyl 4,4,4-trifluoroacetoacetate (TFA)

Preferably the catalyst, component (c), will be present in an amount of from 0.3 to 6 parts by weight per 100 parts by weight of component (a), i.e. from about 0.2 to 2 weight % of the composition component (c) may be present in an amount of greater than 6 parts by weight in cases where chelating agents are used.

In one embodiment the process is used to prepare a one or two part organopolysiloxane sealant composition. A two part composition comprises in the first part diluted polymer and filler (when required) and in the second part catalyst and cross-linker are provided for mixing in an appropriate ratio (e.g. from 1:1 to 10:1) immediately prior to use. Additional additives to be discussed below may be provided in either part 1 or part 2 of the part composition but are preferably added in part two.

The one or two part compositions of the present invention may be formulated as to be stable in storage but cure on exposure to atmospheric moisture (after mixing in the case of two part compositions) and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures where the visual appearance of the sealant is important.

Thus in a further aspect, the invention provides a method of sealing a space between two units, said method comprising applying a composition as described above and causing or allowing the composition to cure. Suitable units include glazing structures or building units as described above and these form a further aspect of the invention.

Compositions of this invention may contain, as optional constituents, other ingredients which are conventional to the formulation of silicone rubber sealants and the like. For example, the compositions will normally contain one or more finely divided, reinforcing fillers such as high surface area fumed and precipitated silicas and to a degree calcium carbonate as discussed above, or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material. For the sake of clarification it should be understood that fatty acids and/or fatty acid esters used for treating fillers are separate from those discussed as an essential additive of the present invention and typically any hydrophobing treatment of the filler will have been done independently of the fatty acid and/or fatty acid esters essential to the present invention.

The proportion of such fillers when employed will depend on the properties desired in the elastomer-forming composition and the cured elastomer. Usually the filler content of the composition will reside within the range from about 5 to about 150 parts by weight per 100 parts by weight of the polymer excluding the extender portion.

Other ingredients which may be included in the compositions include but are not restricted to co-catalysts for accelerating the cure of the composition such as metal salts of carboxylic acids and amines; rheological modifiers; Adhesion promoters, pigments, Heat stabilizers, Flame retardants, UV stabilizers, cure modifiers Chain extenders, electrically and/or heat conductive fillers, Fungicides and/or biocides and the like (which may suitably by present in an amount of from 0 to 0.3% by weight), water scavengers, (typically the same compounds as those used as cross-linkers or silazanes). It will be appreciated that some of the additives are included in more than one list of additives. Such additives would then have the ability to function in all the different ways referred to.

The rheological additives include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols. Some of these rheological additives may additionally enhance the adhesive properties of the composition.

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercaptoalkylalkoxy silanes and γ-aminopropyl triethoxysilane, reaction products of ethylenediamine with silylacrylates. Isocyanurates containing silicon groups such as 1,3,5-tris (trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

Heat stabilizers may include Iron oxides and carbon blacks, Iron carboxylate salts, cerium hydrate, barium zirconate, cerium and zirconium octoates, and porphyrins.

Flame retardants may include for example, carbon black, hydrated aluminium hydroxide, and silicates such as wollastonite, platinum and platinum compounds.

Chain extenders may include difunctional silanes which extend the length of the polysiloxane polymer chains before crosslinking occurs and, thereby, reduce the modulus of elongation of the cured elastomer. Chain extenders and cross-linkers compete in their reactions with the functional polymer ends; in order to achieve noticeable chain extension, the difunctional silane must have substantially higher reactivity than the typical trifunctional cross-linker. Suitable chain extenders for condensation cure systems are, suitable chain extender include for example:— said chain extender being selected from the group of
(i) a Diacetamidosilane, a diacetoxysilane, a diaminosilane where each amino group has one or two N—H bonds per nitrogen; a dialkoxysilane, a diamidosilane, a hexaorganodisilazane, a diketoximinosilane;
(ii) a polydialkylsiloxane having a degree of polymerisation of from 2 to 25 and having at least two acetamido or acetoxy or amino or alkoxy or amido or ketoximo substituents per molecule,
(iii) an α-aminoalkyldialkoxyalkylsilane wherein the alkyl and alkoxy groups contain from 1 to 6 carbon atoms,
(iv) a compound of the structure $ZMe_2SiO(Me_2SiO)_ySiMe_2Z$ or $ZMe_2Si$—Y—$SiMe_2Z$
where Z is a heterocyclic Si—N group Y is a divalent hydrocarbon radical selected from the group consisting of —$(CR_2)_m$— or —$C_6H_4$—, y is 0 or a whole number, and m is 2 to 6 inclusive and R is a monovalent hydrocarbon group;

Specific examples of chain extenders include alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, and alkenylalkyldihydroxysilanes such as vinyl methyl dihydroxysilane, vinyl ethyldihydroxysilane, vinyl methyldihydroxysilane, vinylethyldihydroxysilane.methylphenyl-dimethoxysilane, di-butoxy diacetoxysilane, Alkylalkenylbis(N-alkylacetamido) silanes such as methylvinyldi-(N-methylacetamido)silane, and methylvinyldi-(N-ethylacetamido)silane; dialkylbis(N-arylacetamido) silanes such as dimethyldi-(N-methylacetamido)silane; and dimethyldi-(N-ethylacetamido) silane; Alkylalkenylbis(N-arylacetamido) silanes such as methylvinyldi(N-phenylacetamido)silane and dialkylbis(N-arylacetamido) silanes such as dimethyldi-(N-phenylacetamido)silane, methylvinyl bis (N-methylacetamido)silane, methylhydrogendiacetoxysilane, dimethylbis(N-diethylaminoxy)silane and dimethylbis (sec.-butylamino)silane. The chain extender used may also comprise any combination of two or more of the above.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Any suitable Fungicides and biocides may be utilised, these include N-substituted benzimidazole carbamate, benzimidazolylcarbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate. 10,10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3). Methyl-benzimideazol-2-ylcarbamate (trade names: Carbendazim, Preventol BCM), Zincbis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolyl-compounds, such as tebuconazol in combination with zeolites containing silver.

The compositions are preferably room temperature vulcanisable compositions in that they cure at room temperature without heating.

A composition in accordance with the present invention may be prepared by mixing the constituents of the composition employing any suitable mixing equipment. Optional constituents may be added as required. For example preferred one part, moisture curable compositions may be made by mixing together the diluted polymer having hydroxyl or hydrolysable groups and filler used, and mixing this with a pre-mix of the cross-linker and catalyst. UV-stabilisers pigments and other additives may be added to the mixture at any desired stage. If required additional diluent may be blended with the other composition ingredients after polymerisation.

After mixing, the compositions may be stored under substantially anhydrous conditions, for example in sealed containers, until required for use.

In accordance with the present invention there is provided a method to prepare a moisture curable composition capable of cure to an elastomeric body comprising
(a) preparing a diluted silicon containing polymer of the formula $$X\text{-}A\text{-}X^1$$

where X and $X^1$ are independently selected from silyl groups which contain one or more condensable substituents per group and A is a polymeric chain having a number average molecular weight ($M_n$) of at least 132 000; and a degree of polymerisation of at least 1800 by polymerising a monomer and/or oligomer in the presence of an organic based diluent material, a suitable catalyst and optionally an end-blocker; and
b) Where required quenching the polymerisation process; and then blending the polymer with a suitable cross-linking agent which comprises at least two groups which are reactable with the condensable groups in the diluted polymer; a suitable condensation catalyst and optionally one or more fillers.

The diluted silicon containing polymer is preferably an organopolysiloxane containing polymer having hydroxyl and/or hydrolysable terminal end groups of the composition in accordance with the present invention may be obtained by any suitable polymerisation process provided the polymer is diluted in the extender and/or plasticiser during the polymerisation process. Preferred routes to the preparation of said diluted silicon containing polymer are by the following routes
   (i) polycondensation
   (ii) ring opening/equilibrium
   (iii) polyaddition
   (iv) chain extension
   (v)
wherein where required polymers resulting from the above polymerisation routes may be end-capped to provide the required hydrolysable end-groups.
   (i) Polycondensation (i.e. the polymerisation of multiple monomers and/or oligomers with the elimination of low molecular weight by-product(s) such as water, ammonia or methanol etc).

Any suitable polycondensation reaction pathway may be utilised. Preferred are polycondensation reactions relying on the reaction schemes hereinbefore described for condensation reactions with the interaction of compounds having hydroxyl and/or hydrolysable end groups most preferred.

In the case where A is an organosiloxane chain, a preferred method for the polymerisation process is the polymerisation of straight chain and/or branched organopolysiloxanes of formula (2) above in which $R^5$ and subscript s are as previously described The starting materials for the polymerisation are preferably substantially linear materials, which are end-blocked with a siloxane group of the formula $R''_3SiO_{1/2}$, wherein each R" is the same or different and is $R^5$ or a condensable group. Any suitable combination of condensable end groups may be used for the polymerisation process of the present invention (i.e. the condensable groups chosen must be able to undergo a condensation reaction together in order to polymerise). Preferably at least one R" group is a hydroxyl or hydrolysable group. Typically the condensable groups used as monomer/oligomer end-groups are silyl groups comprising hydroxyl-terminating or hydrolysable substituents such as —$SiOH_3$, —$(R^a)SiOH_2$, —$(R^a)_2SiOH$, —$R^aSi(OR^b)_2$, —$Si(OR^b)_3$, —$R^a_2SiOR^b$ or —$R^a_2Si$—$R^c$—$SiR^d_p(OR^b)_{3-p}$ where each $R^a$, $R^b$, $R^d$, $R^c$ and p are as hereinbefore described.

Starting materials for the condensation reaction of silanol containing siloxanes are organopolysiloxane oligomers having silicon-bonded hydroxyl groups or hydrolysable groups such as alkoxy groups, which may form silanol groups in situ. Preferably the starting materials have a viscosity of between 10 mPa·s and 5000 mPa·s. Some of the starting materials may comprise non-hydrolysable end-groups.

Many of the above processes require the presence of catalyst. Any suitable polycondensation catalyst may be utilised. These include any of the catalysts described above for the condensation cure of the composition in accordance with the present invention, protic acids, Lewis acids, organic and inorganic bases, metal salts and organometallic complexes. Lewis acid catalysts. (a "Lewis acid" is any substance that will take up an electron pair to form a covalent bond). suitable for the polymerisation in the present invention include, for example, boron trifluoride $FeCl_3$, $AlCl_3$, $ZnCl_2$, and $ZnBr_2$.

More preferred are condensation specific catalysts such as acidic condensation catalysts of the formula $R^{20}SO_3H$ in which $R^{20}$ represents an alkyl group preferably having from 6 to 18 carbon atoms such as for example a hexyl or dodecyl group, an aryl group such as a phenyl group or an alkaryl group such as dinonyl- or didoecyl-naphthyl. Water may optionally be added. Preferably $R^{20}$ is an alkaryl group having an alkyl group having from 6 to 18 carbon atoms such as dodecylbenzenesulphonic acid (DBSA). Other condensation specific catalysts include n-hexylamine, tetramethylguanidine, carboxylates of rubidium or caesium, hydroxides of magnesium, calcium or strontium and other catalysts as are mentioned in the art, e.g. in GB patent specifications 895091, 918823 and EP 0382365. Also preferred are catalysts based on phosphonitrile chloride, for example those prepared according to U.S. patent specifications 3,839,388 and 4,564,693 or EP application 215 470 and phosphonitrile halide ion based catalysts, as described in GB2252975, having the general formula $[X^3(PX^3_2\!=\!N)_sPX^3_3]^+[M^2X^3_{(v-t+1)}R^{III}_t]^-$, wherein $X^3$ denotes a halogen atom, $M^2$ is an element having an electronegativity of from 1.0 to 2.0 according to Pauling's scale, $R^{III}$ is an alkyl group having up to 12 carbon atoms, s has a value of from 1 to 6, v is the valence or oxidation state of $M^2$ and t has a value of from 0 to v−1.

Alternatively the catalyst may comprise an oxygen-containing chlorophosphazene containing organosilicon radicals having the following general formula:—

$$Z^1\text{-}PCl_2\!=\!N(\!-\!PCl_2\!=\!N)_n\!-\!PCl_2\!-\!O$$

in which $Z^1$ represents an organosilicon radical bonded to phosphorus via oxygen, a chlorine atom or the hydroxyl group and n represents 0 or an integer from 1 to 8. The catalyst may also comprise condensation products of the above and/or tautomers thereof (the catalyst exists in a tautomeric form when $Z^1$ is a hydroxyl group).

A further alternative catalyst which might be used as the catalyst in the present invention is any suitable compound providing a source of anions comprising at least one quadrisubstituted boron atom and protons capable of interaction with at least one silanol group as defined in WO 01/79330.

The activity of the catalyst is preferably quenched by using a neutralizing agent which reacts with the catalyst to render it non-active. Typically in the case of the acid type condensation catalysts the neutralising agent is a suitable base such as an amine such as a mono/di and trialkanolamines for example monoethanolamine (MEA) and triethanolamine (TEA). In the case of systems using a DBSA catalyst alternative quenching means include aluminasilicate zeolite materials that were found to absorb DBSA and leave a stable polymer. In most cases catalyst residues remain in the polymer product or where appropriate may be removed by filtration or alternative methods. In the case of phosphazene based catalysts when the desired viscosity has been reached, the viscosity of the organosilicon compound obtained in the process can be kept constant by a procedure in which the catalyst used, or a reaction product which has been formed from this catalyst by reaction with organosilicon compound to be subjected to condensation and/or equilibration and likewise promotes the condensation and/or equilibration of organosilicon compounds, is inhibited or deactivated by addition of inhibitors or deactivators which have been employed to date in connection with phosphazenes, for example, triisononylamine, n-butyl-lithium, lithium siloxanolate, hexamethyldisilazane and magnesium oxide.

Where appropriate any suitable end-blocking agent, which halts the polymerization reaction and thereby limits the average molecular weight, may be used to introduce the silyl end groups described above as $X^2$ and $X^1$.

(II) Equilibration/Ring Opening

The starting material for equilibration polymerisation processes such as ring-opening polymerisation is a cyclosiloxane (also known as a cyclic siloxane). Cyclic siloxanes which are useful are well known and commercially available materials. They have the general formula $(R^{21}SiO)_m$, wherein each $R^{21}$ is R' is as hereinbefore described and m denotes an integer with a value of from 3 to 12. $R^{21}$ can be substituted, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. The aryl and aralkyl groups can be, for example, phenyl, tolyl, and benzoyl. The preferred groups are methyl, ethyl, phenyl, vinyl, and trifluoropropyl. Preferably at least 80% of all $R^{21}$ groups are methyl or phenyl groups, most preferably methyl. Preferably the average value of m is from 3 to 6. Examples of suitable cyclic siloxanes are octamethylcyclotetrasiloxane, hexamethylcyclotrisiloxane, decamethylcyclopentasiloxane, cyclopenta(methylvinyl)siloxane, cyclotetra(phenylmethyl)siloxane, cyclopentamethylhydrosiloxane and mixtures thereof. One particularly suitable commercially available material is a mixture of comprising octamethylcyclotetrasiloxane and decamethylcyclopentasiloxane. Typically moisture is present in the monomers. The water present acts as an end-blocker by forming OH end groups on the polymers.

Any suitable catalyst may be used. These include alkali metal hydroxides such as lithium hydroxide, sodium hydroxide, potassium hydroxide or caesium hydroxide, alkali metal alkoxides or complexes of alkali metal hydroxides and an alcohol, alkali metal silanolates such as potassium silanolate caesium silanolate, sodium silanolate and lithium silanolate or trimethylpotassium silanolate. Other catalysts which might be utilised include the catalyst derived by the reaction of a tetra-alkyl ammonium hydroxide and a siloxane tetramer and the boron based catalysts as hereinbefore described.

Catalysts which are most preferred for the equilibrium type of reaction however are phosphonitrile halides, phosphazene acids and phosphazene bases as hereinbefore described.

Where required the polymer obtained may be end-blocked as a means of regulating the molecular weight of the polymer and/or to add functionality. Suitable end-blocking agents include silanes having 1 group capable of reacting with the terminal groups of the resulting polymeric constituent prepared in the diluted polymer. Preferred silanes which may be utilised as end-blockers however for the purpose of the present invention. They are used to introduce the hydroxyl and hydrolysable groups depicted above as $X^2$ and $X^1$.

(III) Polyaddition

For the sake of this specification a "polyaddition" or "addition polymerisation" process is a polymerisation process whereby unlike in a condensation reaction no by-products such as water or alcohols are generated from the monomeric and oligomeric co-reactants during polymerisation. A preferred addition polymerisation route is a hydrosilylation reaction between an unsaturated organic group e.g. an alkenyl or alkynyl group and an Si—H group in the presence of a suitable catalyst.

Typically the polyaddition route is utilised to form block copolymers by reacting
   (a) (i) an organopolysiloxane or
      (ii) silane with:—
   (b) (i) one or more organopolysiloxane polymer(s) or
      (ii) one or more organic polymer(s)
      via an addition reaction pathway in the presence of the extender and/or plasticiser, and a suitable catalyst and optionally an end-blocking agent; and where required quenching the polymerisation process.

The organopolysiloxane or silane (a) is selected from a silane (a) (ii) containing at least one group capable of undergoing addition type reactions and an organopolysiloxane monomer (a) (i) containing groups capable of undergoing addition type reactions. The organopolysiloxane or silane (a) must contain substituents such that it is capable of undergoing an appropriate addition reaction with polymers (b) (i) or (ii). The preferred addition reaction is a hydrosilylation reaction between an unsaturated group and an Si—H group.

Preferably silane (a) (ii) has at least 1 and preferably 2 groups capable of undergoing addition type reactions with (b) (i) or (ii). When the addition reaction is a hydrosilylation reaction the silane may contain an unsaturated constituent but preferably contains at least one Si—H group. Most preferably each silane contains one or more Si—H groups. In addition to the one or more Si—H groups, preferred silanes may include for example an alkyl group, an alkoxy group, an acyloxy group, a ketoximato group, an amino group, an amido group, an acid amido group, an aminoxy group, a mercapto group, an alkenyloxy group and the like. Among these, alkoxy, acyloxy, ketoximato, amino, amido, aminoxy, mercapto and alkenyloxy groups are preferred. Practical examples of the silicon hydride are halosilane tri-chlorosilane, methyl dichlorosilane, dimethyl chlorosilane, and phenyl dichlorosilane; alkoxy silanes, such as tri-methyoxy silane, tri-ethoxy silane, methyl di-ethoxy silane, methyl di-methoxy silane and phenyl-di-methoxy silane; acyloxy silanes, such as methyl diacetoxy silane and phenyl diacetoxy silane; and ketoximato silanes, such as bis-(dimethyl-ketoximate)-methyl silane and bis-(cyclohexyl ketoximate)methyl silane. Among them, halosilanes and alkoxyl silanes are preferred. Particularly preferred silanes include for example methyl dimethoxy silane (H—Si (—CH$_3$) (—OCH$_3$)$_2$).

It will be appreciated that the addition reaction between silane (a) (ii) and (b) (i) or (ii) results in a polymer chain extension process or as a means of end—blocking a polymer with pre-required end groups, in which case the extender may be added in combination with silane (a) (ii), i.e. immediately prior to the addition reaction or may be present during the polymerisation of polymer (b) (i) and/or (b) (ii) and as such silane (a) (ii) is added to an extended polymer (b) (i) or (b) (ii) which has been polymerised in the presence of the extender.

Organopolysiloxane monomer (a) (i) is preferably in the form of a straight chain and/or branched organopolysiloxane of formula (1a)

$$R'_a SiO_{4-a/2} \quad (1a)$$

wherein each R' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably each R' is the same or different and are exemplified by, but not limited to hydrogen, alkyl groups such as methyl, ethyl, propyl, butyl, pentyl, hexyl, heptyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Some R' groups may be hydrogen groups. Preferably the polydiorganosiloxanes are polydialkylsiloxanes, most preferably polydimethylsiloxanes. When the organopolysiloxane or silane (a) is an Organopolysiloxane monomer, said organopolysiloxane monomer must have at least one group which is reactable with at least two groups, typically the terminal groups, of (b) (i) or (ii) via an addition reaction process. Preferably organopolysiloxane (a) (i) comprises at least one Si—H per molecule, preferably at least two Si—H groups per molecule. Preferably organopolysiloxane (a) (i) is end-blocked with a siloxane group of the formula $H(R")_2SiO_{1/2}$, wherein each R" is a hydrocarbon or substituted hydrocarbon group, most preferably an alkyl group. Preferably organopolysiloxane (a) (i) has a viscosity of between 10 mPa·s and 5000 mPa·s at 25° C.

Organopolysiloxane polymer (b) (i) is preferably a straight chain and/or branched organopolysiloxane of formula (1b)

$$R'''_a SiO_{4-a/2} \quad (1b)$$

wherein each R''' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably no R''' groups may be hydrogen groups. Preferably each R''' is the same or different and are exemplified by, but not limited to alkyl groups such as methyl, ethyl, propyl, butyl, pentyl, hexyl, heptyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl.

Organopolysiloxane polymer (b) (i) may comprise any suitable organopolysiloxane polymeric backbone but is preferably linear or branched, and comprises at least one, preferably at least two substituent groups which will react with the aforementioned groups in the organopolysiloxane or silane (a) via an addition reaction pathway. Preferably the or each substituent group of polymer (b) (i) is a terminal group. When the organopolysiloxane or silane (a) comprises at least one Si—H group, the preferred substituent groups on organopolysiloxane polymer (b) (i), which are designed to interact with the Si—H groups, are preferably unsaturated groups (e.g. alkenyl terminated e.g. ethenyl terminated, propenyl terminated, allyl terminated ($CH_2$=$CHCH_2$—)) or terminated with acrylic or alkylacrylic such as $CH_2$=$C(CH_3)$—$CH_2$— groups Representative, non-limiting examples of the alkenyl groups are shown by the following structures; $H_2C$=$CH$—, $H_2C$=$CHCH_2$—, $H_2C$=$C(CH_3)CH_2$—, $H_2C$=$CHCH_2CH_2$—, $H_2C$=$CHCH_2CH_2CH_2$—, and $H_2C$=$CHCH_2CH_2CH_2CH_2$—. Representative, non-limiting examples of alkynyl groups are shown by the following structures; HC≡C—, HC≡CCH$_2$—, HC≡CC(CH$_3$)—, HC≡CC(CH$_3$)$_2$—, HC≡CC(CH$_3$)$_2$CH$_2$— Alternatively, the unsaturated organic group can be an organofunctional hydrocarbon such as an acrylate, methacrylate and the like such as alkenyl an/or alkynyl groups. Alkenyl groups are particularly preferred.

The organic polymer (b) (ii) may comprise any suitable organic based polymer backbone for example the organic polymer backbone may comprise, for example, polystyrene and/or substituted polystyrenes such as poly(α-methylstyrene), poly(vinylmethylstyrene), poly(p-trimethylsilylstyrene) and poly(p-trimethylsilyl-α-methylstyrene). In each case the monomers used for organic polymer (b) (ii) comprise at least two substituent groups as described for b(i) which will react with the reactive groups of the organopolysiloxane or silane (a). Typically the organic polymer (b) (ii) comprises at least two unsaturated terminal groups, preferably alkenyl terminal groups available for interaction with e.g. Si—H groups of the organopolysiloxane or silane (a). Other organic based monomers (b) (ii) may include acetylene terminated oligophenylenes, vinylbenzyl terminated aromatic polysulphones oligomers. Further organic polymeric backbones suitable as (b) (ii) include aromatic polyester based monomers and aromatic polyester based monomers, both preferably comprising alkenyl terminal groups.

Perhaps the most preferred organic based polymeric backbone for use as polymer (b) (ii) are polyoxyalkylene based polymers (as hereinbefore described) having unsaturated (e.g. alkenyl) terminal groups. The number average molecular weight of each polyoxyalkylene polymer (b) may range from about 300 to about 10,000. Moreover, the oxyalkylene units are not necessarily identical throughout the polyoxyalkylene monomer, but can differ from unit to unit.

Any appropriate method of making polyoxyalkylene monomers for use as polymer (b) (ii) in the present application may be utilised. Examples include those described in EP0397036, U.S. Pat. No. 3,971,751, EP0196565, and WO2005/103117. However, for the sake of this invention the method of preparation of the polyoxyalkylene polymer (b) is immaterial with respect to the present invention. Any appropriate method of making polyoxyalkylene amide polymers (b) discussed above may be utilised. Preferred methods include those described in WO9906473, WO200306530 and WO2005103117, the contents of which are incorporated herein by reference.

In cases where the organopolysiloxane or silane (a) comprises only one addition reactable group and (b) (i) or (ii) comprises two addition reactable groups which will react with the organopolysiloxane or silane (a), the resulting product will be an "ABA" type polymeric product. Whereas when both the organopolysiloxane or silane (a) comprises only one addition reactable group and (b) (i) or (ii) comprises two addition reactable groups which will react with the organopolysiloxane or silane (a) interaction between the two components would lead to (AB)n block copolymers in which the length of the polymer is largely determined by the relative amounts of the two constituents.

Hence linear non-hydrolyzable (AB)n block copolymers in accordance with the present invention of this invention can be prepared by catalyzed hydrosilylation of alkenyl terminated polyethers with SiH-terminated dialkylsiloxane fluids. The resulting copolymer being a combination of polyoxyalkylene blocks linked through silicon to carbon to oxygen linkages (i.e. a propyleneoxy group) and the endblocking groups being selected from the group consisting of allyl, propenyl and/or hydrogen (dialkyl) siloxy groups (dependent on the relative amounts of the constituents which are present).

When the addition reaction chosen is a hydrosilylation reaction, any suitable hydrosilylation catalyst may be utilised. Such hydrosilylation catalysts are illustrated by any metal-containing catalyst which facilitates the reaction of silicon-bonded hydrogen atoms of the SiH terminated organopolysiloxane with the unsaturated hydrocarbon group on the polyoxyethylene. The metals are illustrated by ruthenium, rhodium, palladium, osmium, iridium, or platinum.

Hydrosilylation catalysts are illustrated by the following; chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum supported on metal oxide carriers such as $Pt(Al_2O_3)$, platinum black, platinum acetylacetonate, platinum(divinyltetramethyldisiloxane), platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, Such noble metal catalysts are described in U.S. Pat. No. 3,923,705, incorporated herein by reference to show platinum based catalysts. One preferred platinum based catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum based catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

Ruthenium catalysts such as $RhCl_3(Bu_2S)_3$ and ruthenium carbonyl compounds such as ruthenium 1,1,1-trifluoroacetylacetonate, ruthenium acetylacetonate and triruthinium dodecacarbonyl or a ruthenium 1,3-ketoenolate may alternatively be used.

Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4{}_3[(R^3)_2S]_3$, $(R^2{}_3P)_2Rh(CO)X$, $(R^2{}_3P)_2Rh(CO)H$, $Rh_2X^4{}_2Y^2{}_4$, $H_aRh_b olefin_c Cl_d$, $Rh(O(CO)R^3)_{3-n}(OH)_n$ where $X^4$ is hydrogen, chlorine, bromine or iodine, $Y^2$ is an alkyl group, such as methyl or ethyl, CO, $C_8H_{14}$ or $0.5\ C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z)(En)_2]_2$, or $(Ir(Z^2)(Dien)]_2$, where $Z^2$ is chlorine, bromine, iodine, or alkoxy, En is an olefin and Dien is cyclooctadiene may also be used.

Additional components can be added to the hydrosilylation reaction which are known to enhance such reactions. These components include salts such as sodium acetate which have a buffering effect in combination with platinum based catalysts.

The amount of hydrosilylation catalyst that is used is not narrowly limited as long as there is a sufficient amount to accelerate a reaction between the polyoxyethylene having an unsaturated hydrocarbon group at each molecular terminal and the SiH terminated organopolysiloxane at room temperature or at temperatures above room temperature. The exact necessary amount of this catalyst will depend on the particular catalyst utilized and is not easily predictable. However, for platinum-containing catalysts the amount can be as low as one weight part of platinum for every one million weight parts of components the polyoxyethylene having an unsaturated hydrocarbon group at each molecular terminal and the SiH terminated organopolysiloxane. The catalyst can be added at an amount 10 to 120 weight parts per one million parts of components the polyoxyethylene having an unsaturated organic group at each molecular terminal and the SiH terminated organopolysiloxane, but is typically added in an amount from 10 to 60 weight parts per one million parts of the polyoxyethylene having an unsaturated organic group at each molecular terminal and the SiH terminated organopolysiloxane. The present compositions can also be cured and/or crosslinked by a hydrosilylation reaction catalyst in combination with an organohydrogensiloxane as the curing agent instead of an organic peroxide, providing each polymer molecule contains at least two unsaturated groups suitable for cross-linking with the organohydrogensiloxane. These groups are typically alkenyl groups, most preferably vinyl groups. To effect curing of the present composition, the organohydrogensiloxane must contain more than two silicon bonded hydrogen atoms per molecule. The organohydrogensiloxane can contain, for example, from about 4-20 silicon atoms per molecule, and have a viscosity of up to about 10 Pa·s at 25° C. The silicon-bonded organic groups present in the organohydrogensiloxane can include substituted and unsubstituted alkyl groups of 1-4 carbon atoms that are otherwise free of ethylenic or acetylenic unsaturation.

When the silicon containing material is a organopolysiloxane having at least two Si—H groups, typically, the process is carried out using approximately a 1:1 molar ratio of ≡Si—H containing polysiloxane and the material containing unsaturation. It is expected that useful materials may also be prepared by carrying out the process with an excess of either the ≡Si—H containing polysiloxane or the material containing unsaturation, but this would be considered a less efficient use of the materials. Typically, the material containing the unsaturation is used in slight excess to ensure all the SiH is consumed in the reaction.

Where required the polymer obtained may be end-blocked as a means of regulating the molecular weight of the polymer and/or to add functionality. Suitable end-blocking agents include silanes having 1 group capable of undergoing addition type reactions with the terminal groups in the diluted polymer. When the addition reaction is a hydrosilylation reaction the silane may contain an unsaturated constituent but preferably contains an Si—H group. In addition to the one or more Si—H groups, preferred silanes may include for example an alkoxy group, an acyloxy group, a ketoximato group, an amino group, an amido group, an acid amido group, an aminoxy group, a mercapto group, an alkenyloxy group and the like. Among these, alkoxy, acyloxy, ketoximato, amino, amido, aminoxy, mercapto and alkenyloxy groups are preferred. Practical examples of the silicon hydride are halosilane tri-chlorosilane, methyl dichlorosilane, dimethyl chlorosilane, and phenyl dichlorosilane; alkoxy silanes, such as tri-methyoxy silane, tri-ethoxy silane, methyl di-ethoxy silane, methyl di-methoxy silane and phenyl-di-methoxy silane; acyloxy silanes, such as methyl di-acetoxy silane and phenyl diacetoxy silane; and ketoximato silanes, such as bis-(dimethyl-ketoximate)-methyl silane and bis-(cyclohexyl ketoximate)methyl silane. Among them, halosilanes and alkoxyl silanes are preferred. Particularly preferred silanes include for example methyl dimethoxy silane (H—Si(—$CH_3$)(—$OCH_3$)$_2$).

Hydrolysable groups which may be introduced using end-blockers and where required subsequent reactions include —SiOH$_3$, —(R$^a$)SiOH$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2.

(IV) Chain Extension

In this case rather than adding chain extender into a final pre-prepared polymer composition the extender is mixed into the polymer during a chain extension polymerisation step prior to the introduction of the other constituents of the sealant composition. Typically the polymeric starting material is an organopolysiloxane having end groups suitable for interaction with the chosen chain extending materials. Typically the polymer end groups are either hydrolysable or suitable for addition reaction (typically hydrosilylation) and the chain extending material is chosen on the basis of having suitable reactive groups which will chain extend the polymer. Preferred chain extending materials for chain extending polymers having hydroxyl and/or hydrolysable end groups are as hereinbefore described.

For pre-formed polymers with alkenyl or Si—H end groups suitable for addition reactions via a hydrosilylation route chain extender include for example:—

For pre-formed polymers with alkenyl or Si—H end groups suitable for addition reactions via a hydrosilylation route chain extender include for example:—

A silane comprising two alkenyl groups, a dihydrosilane, a polydialkylsiloxane having a degree of polymerisation of from 2 to 25 and at least one Si-alkenyl bond per terminal group, A polydialkylsiloxane having a degree of polymerisation of from 2 to 25 and at least one Si—H bond per terminal group and wherein each alkyl group independently comprises from 1 to 6 carbon atoms;

organosilicon compounds with the general formula

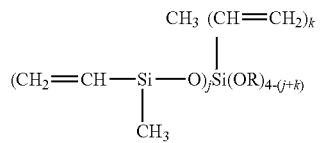

in which R is as hereinbefore described, j is 1, 2, or 3, k is 0 or 1, and j+k is 2 or 3.

exemplified by compounds with the following formulas,
(ViMe$_2$SiO)$_2$SiVi(OMe)$_1$  (ViMe$_2$SiO)$_1$SiVi(OMe)$_2$,
(ViMe$_2$SiO)$_2$SiVi(OEt)$_1$,  (ViMe$_2$SiO)$_1$SiVi(OEt)$_2$,
(ViMe$_2$SiO)$_3$Si(OMe)$_1$,  (ViMe$_2$SiO)$_2$Si(OMe)$_2$,
(ViMe$_2$SiO)$_3$Si(OEt)$_1$ and (ViMe$_2$SiO)$_2$Si(OEt)$_2$ As used herein, Vi represents a vinyl group, Me represents a methyl group, and Et represents an ethyl group.

The catalyst used to catalyse the chain extension reaction is determined by the reaction to take place. When the reaction occurring is a condensation reaction any suitable condensation catalyst as hereinbefore described may be utilised. When the reaction occurring is a hydrosilylation reaction any suitable hydrosilylation catalyst as hereinbefore described may be utilised.

Where required the polymer contains hydrolysable terminal groups, end-blocking agents as described above in relation to condensation may be utilised to obtain appropriate terminal groups. Where required the polymer contains addition reactable terminal groups, end-blocking agents as described above in relation to polyaddition may be utilised to obtain appropriate terminal groups.

The process can be carried out either batchwise or continuously on any suitable mixers. In case of a polycondensation, generated water can either be removed by chemical drying using e.g. hydrolysable silanes like methyltrimethoxysilane or by physical separation using evaporation, coalescing or centrifuging techniques.

Chain extension may take place at any suitable temperature and pressure for the process concerned in batch or continuous modes of operation as preferred. Hence in the case of the phosphazene catalysed methods polymerisation may occur at temperatures of between 50° C. to 200° C., more preferably 80° C. to 160° C. Furthermore, in order to facilitate removal of the by-products formed during the condensation, for example, water, HCl or alcohol, the condensation and/or equilibration of the organosilicon compounds may be carried out at a pressure below 80 kPa. Alternative methods for the removal of condensation by-products include removal by chemical drying using e.g. hydrolysable silanes like methyltrimethoxysilane (where appropriate) or by physical separation using evaporation, coalescing or centrifuging techniques.

The process can be carried out either batchwise or continuously on any suitable mixers. In case of a polycondensation, generated water can either be removed by chemical drying using e.g. hydrolysable silanes like methyltrimethoxysilane or by physical separation using evaporation, coalescing or centrifuging techniques.

The invention will now be described by way of Example. For the sake of comparison the extender used in all the examples and comparative examples unless otherwise indicated was HYDROSEAL® G250H, a hydrotreated mineral oil cut (n-para 7% iso-para 51% and naphthenic 42%) produced by Total Fina. All viscosity values were measured at 25° C. unless otherwise indicated.

EXAMPLE 1

Chain extension using a dibutylacetoxysilane

Production of the Polymer 50 g of dimethylhydroxy terminated polydimethylsiloxane having a viscosity of 80,000 mPa·s at 25° C. was placed in a suitable container. 0.2 g of dibutoxydiacetoxysilane (DBDAc) and 500 ppm weight (in relation to the polymer) of dibutyltindiacetate catalyst were added together with a stoichiometric quantity of water to hydrolyze the acetoxy groups on the DBDAc. As soon as an initial viscosity increase in viscosity was detected 50 g of extender were introduced into the reaction mixture and the variation in viscosity was tracked until the viscosity of the product reached a maximum.

Sealant Formulation

The resulting polymer sealant (sample 1) was formulated with 86.485% weight polymer produced as described above, 5% weight of a 50% mixture of methyl triacetoxysilane and ethyl triacetoxysilane cross-linker, 8% weight of fumed silica, 0.5% weight of Poly (PO)(EO) (rheology modifier) and 0.015% of dibutyltindiacetate catalyst. The sealant properties are shown in Table 1.

Adhesion test (7dRT) was carried out to show that a bead of sealant successfully bonded to a standard glass plate after being allowed to cure at 23° C. and 50% relative humidity for 7 days. Adhesion was assessed by subsequent to the curing period the beads were pulled at 90o and the failure was rated as follows:

0: adhesive failure—poor adhesion)

1: boundary or mixed mode (adhesive/cohesive) failure—acceptable adhesion.

2: cohesive failure—excellent adhesion

Adhesion test ($7H_2O$) was carried out to show that a bead of sealant successfully bonded to a standard glass plate after being allowed to cure at 23° C. and 50% relative humidity for 7 days and then subsequently 7 days in water. The bead of sealant was pulled as in adhesion test (7dRT).

The cure in depth tests were undertaken to determine how far below the surface the sealant had hardened in 24 and 72 hours by filling a suitable container (avoiding the introduction of air pockets) with sealant, curing the sealant contained in the container for the appropriate period of time at room temperature (about 23° C.) and about 50% relative humidity. After the appropriate curing time the sample is removed from the container and the height of the cured sample is measured.

TABLE 1

| Standards properties | Test method | Sample 1 |
|---|---|---|
| Tack Free Time (min) | ASTM D2377-94 | 24 |
| Penetration (mm/10 * 3 sec) | ASTM D217-97 | 170 |
| Cure in depth 24 h (mm/24 h) | | 1.5 |
| Cure in depth 72 h (mm/72 h) | | 1.7 |
| Specify gravity (kg/l) | ASTM D1475-98 | 0.94 |
| Tensile Strength (sheet 2 mm) (MPa) | ASTM D412-98a | 0.6 |
| Elongation at break (%) | ASTM D412-98a | 1047 |
| 100% modulus (MPa) | ASTM D638-97 | 0.13 |
| Hardness | (Shore A) ASTM D2240-97 | 5 |

| Adhesion Tests | 7dRT | $7H_2O$ |
|---|---|---|
| glass | 2 | 2 |

EXAMPLE 2

The polymer was produced in a laboratory batch reactor having a mixing paddle which mixes a mixture at the same rate (in the following example 179 revolutions per minute (RPM) continuously by varying the power in line with the change in viscosity and thereby using the following procedure:

0.42 kg of dimethylhydroxy terminated polydimethylsiloxane (70 mPa·s) and was introduced into the mixer and stirred sequentially adding 21 g of DBSA catalyst and 0.56 kg of diluent while continuing stirring at 179 RPM. The viscosity of the resulting polymer was tracked by measuring the current (mA) required to maintaining the paddle rotation speed of 179 RPM. Mixing was continued until the viscosity began to drop at which point the catalyst was neutralised with an amine (e.g. 0.5-1.0% triethanolamine). The number averaged molecular weight of the diluted polydimethylsiloxane polymer prepared was 170,000. determined using ASTMD5296-05 on the basis of polystyrene molecular weight equivalents. Table 2 shows the formulation of the polymer.

TABLE 2

| | Sample 2 |
|---|---|
| Diluted Polymer Viscosity (mPa · s) at 25° C. | 19,000 |
| Wt % organopolysiloxane | 39.3 |
| Wt % Diluent | 58.9 |
| Wt % DBSA | 1.5 |
| Wt % Monoethanolamine | 0.3 |

The resulting diluted organopolysiloxane polymer was used as the polymer component in an acetoxy sealant formulation prepared by mixing the diluted polymer as prepared above with the other ingredients of the composition. The physical properties of the resulting sealant (Sample 2) were compared with those of a traditionally produced extended acetoxy sealant formulation having a viscosity of 80 000 mPa·s at 25° C. (Comp. 1) using a polymer polymerized in the absence of diluent material. Table 2 shows the formulation of the acetoxy sealant produced.

TABLE 3

| | Sample 2 | Comp. 1 |
|---|---|---|
| Total Wt % Extended Polymer | 86.385 | — |
| Wt % organopolysiloxane (blended with diluent subsequent to polymerization | — | 56.385 |
| Wt % Diluent (blended with polymer) | — | 30 |
| Wt % triacetoxysilane | 5 | 5 |
| Wt % Fumed Silica (surface area 150 $m^2/g$ (BET)) | 8.6 | 8.6 |
| Dibutyltin acetate | 0.015 | 0.015 |

Physical Properties of Sealant

Standard physical property tests were undertaken to compare the properties of the two sealant formulations after curing (Table 4). The Adhesion testing was undertaken as hereinbefore described in Example 1.

TABLE 4

| | Test Method | Sample 1 | Comp. 1 |
|---|---|---|---|
| Specific Gravity | ASTM D1475-98 | 0.90 | 0.97 |
| Extrusion Rate (g/min) | ASTM D2452-94 | 594 | 700 |
| Tensile Strength (Mpa) | ASTM D412-98a | 1.16 | 2.08 |
| Elongation at Break (%) | ASTM D412-98a | 1098 | 480 |
| Modulus 100% (Mpa) | ASTM D638-97 | 0.13 | 0.44 |
| Hardness (Shore A) | ASTM D2240-97 | 2.00 | 13 |
| Adhesion on glass (1) | | 2 (PASS) | 2 (PASS) |
| Adhesion on glass (2) | | 2 (PASS) | 2 (PASS) |

It will be appreciated that the acetoxy sealant made in accordance with the present invention has a number of advantages over the prior art formulation, for example there is a higher diluent content for a similar rheology (50% vs 30%). The mixing process during the preparation of the sealant is significantly simplified because no blending step for blending polymer and diluent is required. The resulting sealant shows an increase in elasticity as can be seen from the elongation at break of greater than 1000%. This sealant formulation enables the use of polymers which would have had substantially unworkable viscosities were it not for the presence of the diluent during the polymerisation process e.g. 3 400 000 mPa·s without any significant handling difficulties and the fact that the resulting uncured sealant composition has a significantly lower specific gravity enables the manufacturer to fill more sealant cartridges or other packages per kg of sealant produced.

EXAMPLE 3

Two acetoxy sealant formulations (samples 3 and 4) were prepared using a polymer prepared in accordance with the present invention and the physical properties were compared with those of a traditionally produced extended acetoxy sealant formulation having a viscosity of 80 000 (mPa·s) (comp. 2).

Diluted Polymer Samples 3 and 4 were prepared through polymerization of cyclic organopolysiloxanes having the formula $((CH_3)_2SiO)_4$ with a phosphazine base catalyst in the presence of Isopar® P hydrocarbon fluid (sold by Exxonmobil Corporation) as extender which has a initial boiling point of 235° C. and final boiling point of 265° C. (ASTM D 86) and a viscosity of 3.0 mPa·s. (ASTM D 445). The hydroxy terminated polydimethylsiloxane was used as the end-blocker and the silyl phosphate was the selected neutralising agent. The polymer formulations are shown in Table 5

TABLE 5

EXTENDED POLYMER FORMULATION

| | Sample 3 | Sample 4 |
|---|---|---|
| Polymerisation temperature | 100° C. | 120° C. |
| $((CH_3)_2SiO)_4$ (wt %) | 78.394 | 59.795 |
| hydroxy terminated polydimethylsiloxane 70 mPa·s at 25° C. (wt %) | 1.60 | 0.20 |
| Extender (wt %) | 20 | 40 |
| phosphazene base catalyst (wt %) | 0.0035 | 0.0028 |
| Silyl phosphate (wt %) | 0.0025 | 0.0022 |

Table 6 shows the residual monomer left in the composition after completion of the polymerisation reaction together with details of the molecular weight of the polymer obtained for both sample 3 and sample 4 (ASTM D5296-05). The residual monomer may be stripped out of the polymer if required as the boiling point thereof is significantly lower than that of the diluent. The boiling point of $((CH_3)_2SiO)_4$ is 175° C.

TABLE 6

| | Sample 1 | Sample 2 |
|---|---|---|
| residual $((CH_3)_2SiO)_4$ (wt %) | 7.3 | 11.3 |
| Number averaged molecular weight (Mn) | 195,335 | 255,394 |
| Weight averaged molecular weight (Mw) | 429,789 | 561,100 |

An organopolysiloxane sealant composition was prepared from the resulting extended polymers described in Table 3 above. Samples 3 and 4 in Table 7 were prepared from polymer Samples 3 and 4 in table 6 respectively. In this case an additional amount of extender was added to the extended polymer to further reduce the viscosity. The sealant formulations both for the sealant prepared according to the invention and the comparative example. The details of the compositions were provided in Table 7

TABLE 7

| | Sample 3 | Sample 4 | Comp 2 |
|---|---|---|---|
| Total Wt % Extended Polymer | 43.2 | 43.3 | — |
| hydroxy terminated organopolysiloxane 80 000 mPa·s at 25° C. (wt %) (blended with diluent after to polymerisation) | — | — | 56.4 |
| Diluent (blended with polymer subsequent to polymerisation) (wt %) | 43.2 | 43.3 | 30 |
| Triacetoxysilane (wt %) | 5 | 5 | 5 |
| Fumed Silica (surface area 150 m²/g (BET)) (wt %) | 8.585 | 8.585 | 8.585 |
| Dibutyltin acetate (wt %) | 0.015 | 0.015 | 0.015 |

Physical Properties of Sealant

Standard physical property tests were in accordance with example 1 above unless otherwise indicated and the results are provided in Table 8.

TABLE 8

PHYSICAL PROPERTIES OF SEALANT

| | Test Method | Sample 3 | Sample 4 | Comp 2 |
|---|---|---|---|---|
| Specific Gravity | ASTM D1475-98 | 0.92 | 0.90 | 0.97 |
| Penetration (mm/10) | ASTM D217-97 | 152 | 180 | 300 |
| Tensile Strength (Mpa) | ASTM D412-98a | 4.34 | 4.98 | 2.08 |
| Elongation at Break (%) | ASTM D412-98a | >1000 | >1000 | 480 |
| Modulus 100% (Mpa) | ASTM D638-97 | 0.12 | 0.09 | 0.44 |
| Shore A Hardness | ASTM D2240-97 | 4 | 1 | 13 |
| Adhesion on glass (7H₂O) | | 2 (PASS) | 2 (PASS) | 2 (PASS) |
| Adhesion on glass (7dRT) | | 2 (PASS) | 2 (PASS) | 2 (PASS) |

It will be appreciated that the acetoxy sealant made in accordance with the present invention has a number of advantages over the prior art formulation, The resulting sealant shows an increase in elasticity as can be seen from the elongation at break of greater than 1000%. This sealant formulation enables the use of polymers which would have had substantially unworkable viscosities were it not for the presence of the diluent during the polymerisation process without any significant handling difficulties and the fact that the resulting uncured sealant composition has a significantly lower specific gravity enables the manufacturer to fill more sealant cartridges or other packages per kg of sealant produced.

The invention claimed is:
1. A moisture curable composition capable of cure to an elastomeric body comprising:
 (a) a diluted polymer comprising;
  (i) a silicon containing polymer of the formula

$X-A-X^1$ where X and $X^1$ are independently selected from silyl groups which contain one or more condensable substituents per group and A is a polymeric chain having a number average molecular weight ($M_n$) of at least 132,000; and a degree of polymerisation of at least 1800, and
  (ii) an organic extender and/or plasticizer,
 which diluted polymer is obtained by polymerisation in the presence of the organic extender and/or plasticizer, (b) a suitable cross-linking agent which comprises at least two groups which are reactable with the condensable groups in the diluted polymer, (c) a suitable condensation catalyst, and optionally (e) one or more fillers.

2. A composition in accordance with claim 1 wherein A is a siloxane polymeric chain, an organic polymeric chain, a siloxane copolymeric chain or a siloxane/organic block copolymeric chain.

3. A composition in accordance with claim 1 wherein $X^1$ or X are silyl groups comprising hydroxyl-terminating or hydrolysable substituents selected from —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$ where each R$^a$ independently represents an alkyl group; each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to 6 silicon atoms; and p has the value 0, 1 or 2.

4. A composition in accordance with claim 1 wherein the extender and/or plasticiser is selected from one or more of the group of:

trialkylsilyl terminated polydimethyl siloxane, polyisobutylenes (PIB), phosphate esters, polyalkylbenzenes, and linear and/or branched alkylbenzenes esters of aliphatic monocarboxylic acids.

5. A composition in accordance with claim 1 wherein the extender is selected from one or more of the group comprising:

linear or branched mono unsaturated hydrocarbons; and mineral oil fractions comprising linear (n-paraffinic) mineral oils, branched (iso-paraffinic) mineral oils, cyclic (naphthenic) mineral oils, and mixtures thereof.

6. A composition in accordance with claim 1 wherein the cross-linking agent is one or more silane or siloxane which contain acyloxy groups and/or ketoximino groups and the catalyst is a tin catalyst.

7. A composition in accordance with claim 1 wherein the cross-linking agent is one or more silane or siloxane which contain alkoxy groups and alkenyloxy groups and the catalyst is a titanate or zirconate or a chelated titanate or chelated zirconate.

8. A composition in accordance with claim 1 wherein the filler is present and comprises one or more finely divided, reinforcing fillers selected from the group of high surface area fumed silica, precipitated silica, and calcium carbonate, and/or one or more extending fillers selected from the group of crushed quartz, diatomaceous earth, barium sulphate, iron oxide, titanium dioxide, carbon black, talc, and wollastonite.

9. A composition in accordance with claim 1 wherein the diluted polymer is obtained by polymerisation in the extender and/or plasticiser via one of the following pathways:

(i) condensation;

(ii) ring opening/equilibrium;

(iii) polyaddition; and (iv) chain extension wherein where required polymers resulting from the above polymerisation routes may be end-capped to provide the required hydrolysable end-groups.

10. Joint sealants, adhesives, moulded bodies, coatings and formed-in-place gaskets comprising the composition in accordance with claim 1.

11. A method of sealing a space between two units, said method comprising applying a composition in accordance with claim 1 and causing or allowing the composition to cure.

12. A composition in accordance with claim 2 wherein the (i) silicon containing polymer has a viscosity of greater than 1,000,000 mPa·s at 25° C.

13. A composition in accordance with claim 3 wherein the (i) silicon containing polymer has a viscosity of greater than 1,000,000 mPa·s at 25° C.

14. A composition in accordance with claim 6 wherein the (i) silicon containing polymer has a viscosity of greater than 1,000,000 mPa·s at 25° C.

15. A composition in accordance with claim 7 wherein the (i) silicon containing polymer has a viscosity of greater than 1,000,000 mPa·s at 25° C.

16. A composition in accordance with claim 9 wherein the (i) silicon containing polymer has a viscosity of greater than 1,000,000 mPa·s at 25° C.

17. A moisture curable composition capable of cure to an elastomeric body comprising:

(a) a diluted polymer comprising;

(i) a silicon containing polymer of the formula $X\text{-}A\text{-}X^1$ where X and $X^1$ are independently selected from silyl groups which contain one or more condensable substituents per group and A is a siloxane polymeric chain, an organic polymeric chain, a siloxane copolymeric chain or a siloxane/organic block copolymeric chain having a number average molecular weight ($M_n$) of at least 132,000 and a degree of polymerisation of at least 1800, and wherein said silicon containing polymer has a viscosity of greater than 1,000,000 mPa·s at 25° C., and (ii) an organic extender and/or plasticizer, which diluted polymer is obtained by polymerisation in the presence of the organic extender and/or plasticizer, (b) a suitable cross-linking agent which comprises one or more silanes or siloxanes which contain acyloxy groups, ketoximino groups, alkoxy groups and/or alkenyloxy groups which are reactable with the condensable groups in the diluted polymer, (c) a condensation catalyst selected from the group consisting of tin, a titanate, a zirconate, a chelated titanate, and a chelated zirconate, and optionally (e) one or more fillers.

18. A composition in accordance with claim 17 wherein $X^1$ or X are silyl groups comprising hydroxyl-terminating or hydrolysable substituents selected from —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$ where each R$^a$ independently represents an alkyl group; each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to 6 silicon atoms; and p has the value 0, 1 or 2.

19. A moisture curable composition capable of cure to an elastomeric body comprising:

(a) a diluted polymer comprising;
  (i) a silicon containing polymer of the formula $X-A-X^1$ where X and $X^1$ are independently selected from silyl groups which contain one or more condensable substituents per group and A is a polymeric chain having a number average molecular weight ($M_n$) of at least 132,000 and a degree of polymerisation of at least 1800, and wherein said silicon containing polymer has a viscosity of greater than 1,000,000 mPa·s at 25° C., and (ii) an organic extender and/or plasticizer, which diluted polymer is obtained by polymerisation in the presence of the organic extender and/or plasticizer, (b) a suitable cross-linking agent which comprises at least two groups which are reactable with the condensable groups in the diluted polymer, (c) a suitable condensation catalyst, and optionally (e) one or more fillers.

* * * * *